United States Patent
Clark et al.

(10) Patent No.: US 6,442,541 B1
(45) Date of Patent: Aug. 27, 2002

(54) UNIVERSAL DATABASE ADAPTERS

(75) Inventors: David Clark, Woodloes Park; Matthew Perrins, Daventry; Andrew John Smith, Wellesbourne, all of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/342,775

(22) Filed: Jun. 28, 1999

(51) Int. Cl.[7] .............................................. G06F 17/30
(52) U.S. Cl. ........................ 707/3; 707/10; 707/104.1
(58) Field of Search ............................. 707/3, 10, 102, 707/104.1; 709/217, 226; 713/200; 717/4; 345/606

(56) References Cited

U.S. PATENT DOCUMENTS

| | | | |
|---|---|---|---|
| 6,016,499 A | * | 1/2000 | Ferguson .................. 707/104.1 |
| 6,034,697 A | * | 3/2000 | Becker ........................ 345/433 |
| 6,253,196 B1 | * | 6/2001 | Fuh et al. ....................... 707/3 |
| 6,266,666 B1 | * | 7/2001 | Ireland et al. ................. 707/10 |

FOREIGN PATENT DOCUMENTS

EP  0 676 706  11/1995  ........... G06F/17/30

* cited by examiner

*Primary Examiner*—Diane D. Mizrahl
(74) *Attorney, Agent, or Firm*—Marc D. McSwain

(57) ABSTRACT

A set of Java Beans for facilitating data extraction from a JDBC-ODBC database in an application is disclosed. The set of beans includes a database driver manager component, DbQuery, having a plurality of properties allowing an instance of said driver manager to identify a location of said database, to define a query on said database and to store a result of said database query, DbResultSet. The driver manager also exposes an execute method for connecting to the database, executing said query and setting said database query result property, DbResultSet. Also disclosed are 4 selector beans, DbCellSelector, DbRowSelector, DbColumnSelector and DbCellRangeSelector. Each selector has a plurality of properties allowing an instance of a selector component to store a result of a database query having a given data type and to identify a sub-set of said result.

6 Claims, 5 Drawing Sheets

| | | | | | | |
|---|---|---|---|---|---|---|
| FIRSTN | SHILI | MICHAE | SALLY | JOHN | IRVING |
| LASTNA | HAAS | THOMP | KWAN | GEYER | STERN |
| SALARY | 52750.0 | 41250.0 | 38250.0 | 40175.0 | 32250.0 |

☑ Invert data

☑ Include column labels

Applet started.

UNIVERSAL DATABASE ADAPTERS

FIELD OF THE INVENTION

The present invention relates to a set of components for facilitating data extraction from a database.

BACKGROUND OF THE INVENTION

Java Database Connectivity (JDBC) is based on the X/Open SQL (structured query language) Call Level Interface (CLI) specification that defines how client/server interactions should be implemented in the case of database systems. The JDBC standard was first presented in January, 1996 and frozen in June, 1996. Since that time, it has been adopted by all major database vendors including IBM, Informix, Oracle, Sybase, etc.

JDBC is a complete definition of how to implement database communication utilizing Java. Its definition ranges from a low-level API required for a JDBC driver which actually connects to and communicates with the database to a high-level API used to deliver data to an application or applet. The implementation of the API has been included in Java Development Kit (JDK) 1.1 in the java.sql package.

JDBC is cross platform at both the source and the binary level. Thus, switching a back-end database among competing products should not have any impact on the application code. Further, a JDBC-ODBC (Open DataBase Connect) bridge product developed jointly by Intersolv and Javasoft enables JDBC to run against any database which supports ODBC.

When implemented within an applet which runs over the Internet or intranet, it is not necessary for the client computer to have any database software installed in order to access a database through JDBC.

In order to use JDBC, the following tools are needed: JDK version 1.1.1 or higher; a relational database which supports either JDBC or ODBC, for example, Microsoft Access, IBM DB2 Universal Database, Oracle or Sybase; and a JDBC driver which supports the relational database on the client operating system or the JDBC-ODBC bridge product.

JavaSoft has defined four different types of JDBC drivers:

Type 1: This type of driver uses a bridging technique. An example of this type is the JDBC-ODBC bridge. Under this approach, an existing technology like ODBC actually performs the database access. The function of the JDBC driver is to translate the Java methods to the appropriate native calls required by the access technology. This type of driver normally requires that platform-specific code be installed on the client. Thus, it is not appropriate for applets run over the Internet, but could work over a corporate intranet.

Type 2: This type of driver generates calls to the native database API. In particular, the Java methods will invoke the C or C++ functions provided by the database vendor. Like Type 1 drivers, this approach requires platform-specific software to be installed on the client. DB2 utilizes this type of driver when run as an application from a DB2 client. Intersolv and WebLogic also provide this type of driver for Oracle and Sybase.

Type 3: This type of driver communicates from a client to a server using generic networking APIs through TCP/IP sockets. At the server-side, a middleware application translates the generic APIs to the database-specific calls required. This type of driver does not require that any special code be installed on the client. Also, the same middleware application may be used to access different types of databases. DB2 utilizes this type of driver to support applets over the Internet; this type of driver is also available for the other major databases through a variety of vendors.

Type 4: This is a 100% pure Java solution. The driver uses TCP/IP sockets to talk directly to the database engine. This type of driver must generally be provided by the database vendor. There are currently type 4 drivers for mSQL, Oracle, Sybase, Microsoft SQL Server, Interbase and SAS.

In any case, a JDBC Driver Manager forms a link between a JDBC Driver for a database management system (DBMS) and application code. The JDBC driver must register with the Driver Manager. When an application attempts to connect to a particular database, the Driver Manager selects from its list of available drivers to form the connection.

Java Beans are Java components that may be visually connected to each other in a visual builder, such as Lotus BeanMachine, in order to construct solutions. However, making the connection between data held in a relational database, and the ever expanding range of visual Java Beans on the market, is not always as simple as it should be. Java Beans are typically designed to accept data in a specific form, which may not match the form in which the data is held in a database.

DISCLOSURE OF THE INVENTION

The present invention provides a set of components as claimed in claim 1.

In a further aspect the invention provides a visual builder including the set of components according to the invention.

It will be seen that, while the present embodiment provides a collection of Java Beans that facilitate visual connection between JDBC enabled databases, and almost any Java Bean, the invention is applicable to components written in other languages and for connection to any type of database. For example, the components could also be written as a set of ActiveX Controls for use by a visual builder such as Microsoft Visual Studio '97. Such controls can be used to build an application in a similar manner to that for Java Beans, with the exception that the Driver Manager would not be able to rely on the JDBC connectivity supplied by the JDK.

BRIEF DESCRIPTION OF THE DRAWINGS

An embodiment of the present invention will now be described with reference to the accompanying drawings, in which.

DESCRIPTION OF THE PREFERRED EMBODIMENTS

Figure 1:
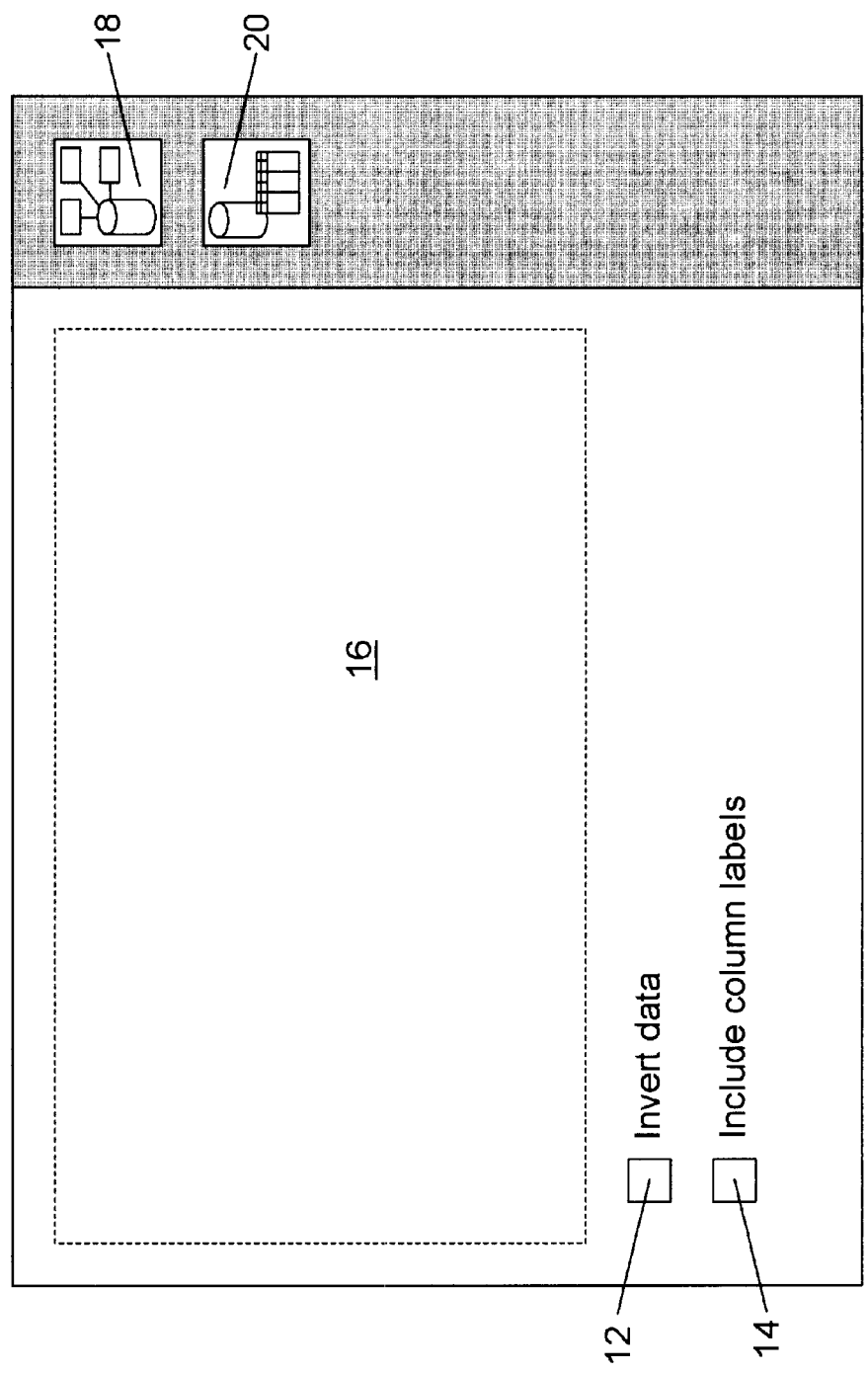
FIG. 1 shows an applet being developed in a visual builder using a plurality of Java Beans according to an embodiment of the invention.

In the present embodiment, five Java Beans are provided: DbQuery; DbCellSelector; DbColumnSelector; DbRowSelector; and DbCellRangeSelector. In addition, a DbResultSet class, although not a bean, provides data coercion functions explained below.

DbQuery

DbQuery corresponds to the Driver Manager discussed above and encapsulates all the information required to connect via JDBC to a database server, execute a query, and extract data from the query's result set. It has the following properties:

Driver: The fully-qualified class name of a JDBC driver to be loaded. Each time this property is modified, an attempt is made to load the Java class for the named JDBC driver. During loading, the JDBC driver will register with the Driver Manager to indicate its availability.

Server: The name of the server with which to make a connection. This uses the same notation as for a URL passed as a parameter to the java.sq1.DriverManager.getConnection( ) method.

Database: The name of the database on which to perform a query.

Userid: The userid for access, if required.

Password: The password for access, if required.

Query: The text of the SQL query to be performed.

DbResultSet: An encapsulation of the data extracted from the query result set. This is a read-only bound property. Changes to DbResultSet are notified whenever a new result set is received, which happens each time the query is executed by invoking the execute( ) method described below.

MaximumRows: The maximum number of rows to be extracted from any query result set. Any additional rows in the result set are ignored.

ErrorMessage: The text of the last error message resulting from executing a query.

ErrorCode: The code of the last error resulting from executing a query.

DbQuery also has the following method:

execute: This method obtains a java.sq1.Connection for the server, obtains a java.sq1.Statement from the connection, and obtains ajava.sq1.ResultSet by calling executeQuery( ) on the statement. A new instance of class DbResultSet is then constructed using the query result set and the current maximum number of rows to extract. Once this is constructed, the connection is closed, and the connection and statement disposed of. A property change event for the DbResultSet property is then notified.

DbResultSet

During construction DbResultSet obtains a java.sq1.ResultSetMetaData from the query's result set, and uses it to determine the names and labels for the result set columns and the SQL type of each column. Data is then extracted from the result set and stored by using a Java Vector for each column. The result set data elements are mapped to the most appropriate Java data type, as defined by the JDBC specification, during extraction.

DbResultSet has service methods for returning the column names, labels, and data types for the encapsulated data. It also provides static methods for coercing data in one form to another form. These methods are named according to the data type that they return, for example getString( ), and for each type of data there are three methods provided: one to coerce a single scalar value; one to coerce a one-dimensional array of values; and one to coerce a two-dimensional array of values. These methods are also able to invert two-dimensional data, and can automatically include the column labels in the data.

An instance of DbResultSet is exchanged as an object between DbQuery and the four Selector classes described below.

Selectors

All the selectors provide properties to identify a subset of the data in a DbResultSet. In addition, they all provide a plurality of "data value" read-only bound properties, one for each of the primitive Java data types plus byte[ ] and String. If the data in a DbResultSet cell does not match the data type returned by one of these bound properties, data coercion is attempted using the static service methods provided by DbResultSet. These bound properties may thus be used to connect selectors to other Java Beans, for example, gauges for displaying data, whatever data types these beans require.

All selectors also have the following properties:

DbResultSet: This is a write-only bound property which enables selectors to be connected to a DbQuery. When this property is modified as a result of the query being executed, a property change is notified for exactly one of the "data value" properties.

BindType: This property defines which one of the "data value" properties will be notified as changed when the DbResultSet property is modified. This is done in order to minimise the number of property change notifications issued, since notifying a property change for all "data value" properties could trigger a lot of unnecessary activity. Any "data value" property may be accessed at any time, since the data extraction and coercion is attempted directly from the DbResultSet whenever the property is accessed.

When defined as "native", each data value will retain the data type with which it has been stored in the DbResultSet. This value is only valid when BindAsVector, explained below, is true.

BindAsVector: When this Boolean property is true, the Vector property will be notified as changed rather than one of the "data value" properties.

Vector: This is used to obtain values in cases where single scalar values or arrays are not acceptable. When this read-only property is accessed, a Vector is returned containing elements of a type determined by BindType. If BindType is "native", the elements may be heterogeneous, each using a type that most closely matches the original SQL data type.

ZeroIndexing: When this Boolean property is true, the first row or column is indexed as 0 rather than 1, altering the interpretation of the RowNumber, ColumnNumber, StartRowNumber, EndRowNumber, StartColumnNumber and EndColumnNumber properties. It is useful because some visual selection beans use zero-based indexing, while others use one-based indexing.

DbCellSelector

This selector is used when a single scalar value is required. It identifies a single cell within a DbResultSet, and returns the value of that cell via bound properties.

In addition to the "data value" properties, and those available on all selectors, DbCellSelector has the following properties:

ColumnName: This may be used to identify the cell's column by the column name.

ColumnNumber: This may be used to identify the cell's column by the column number.

UseColumnName: When this Boolean property is true, ColumnName is used to identify the cell column. When false, ColumnNumber is used.

RowNumber: This identifies the cell's row by the row number.

DbColumnSelector

This selector is used when a one-dimensional array of values is required. It identifies a range of cells within a column in a DbResultSet, and returns the cells as an array via bound properties.

In addition to the "data value" properties, and those available on all selectors, DbColumnSelector has the following properties:

ColumnName: This may be used to identify the cell's column by the column name.

ColumnNumber: This may be used to identify the cell's column by the column number.

UseColumnName: When this Boolean property is true, ColumnName is used to identify the cell column. When false, Column Number is used.

StartRowNumber: This identifies the start of the cell range by the row number.

EndRowNumber: This identifies the end of the cell range by the row number. Zero means "to end of column".

IncludeColumnLabels: When this Boolean property is true, the column label (or column name if there is no column label) is included in the values returned.

DbRowSelector

This selector is used when a one-dimensional array of values is required. It identifies a range of cells within a row in a DbResultSet, and returns the cells as an array via bound properties.

In addition to the "data value" properties, and those available on all selectors, DbRowSelector has the following properties:

StartColumnNumber: This may be used to identify the start of the column range by the column number.

EndColumnNumber: This may be used to identify the end of the column range by the column number.

RowNumber: This may be used to identify the cell's row by the tow number.

DbCellRangeSelector

This selector is used when a two-dimensional array of values is required. It identifies a range of cells within a DbResultSet, and returns the cells as a two-dimensional array via bound properties.

In addition to the "data value" properties, and those available on all selectors, DbCellRangeSelector has the following properties:

StartColumnNumber: This may be used to identify the start of the column range by the column number.

EndColumnNumber: This may be used to identify the end of the column range by the column number.

StartRowNumber: This property identifies the start of the cell range by the row number.

EndRowNumber: This property identifies the end of the cell range by the row number.

IncludeColumnLabels: When this Boolean property is true, the column label (or column name if there is no column label) is included in the values returned.

Worked Example

Figure 2:
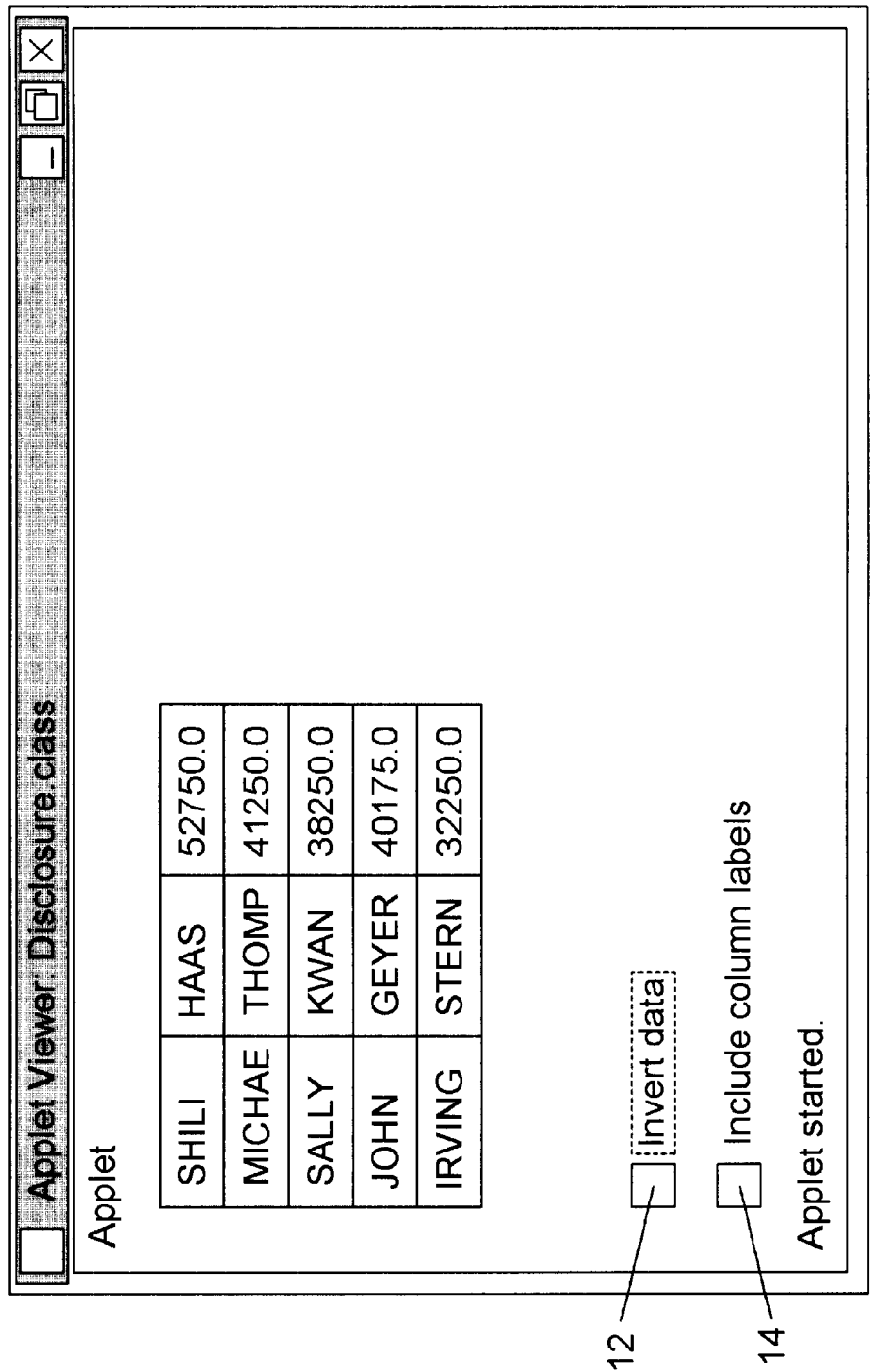
FIGS. 2 to 5 show the applet developed from FIG. 1.

As an example of usage, consider that we wish to obtain the results of a query that will contain five rows and three columns, FIG. 2. The first two columns will be of character type (First Name and Last Name), and the third will be of numeric type (Salary). We would like to display this data in a matrix, and to provide the ability to invert the data with a check box 12, and to include or exclude the column names from the displayed data with a second check box 14.

Taking the Lotus BeanMachine product as an example of an applet visual builder that knows how to connect Java Beans, these are the steps required:

1. First select the beans that will contribute to the solution from the BeanMachine palette, and lay out the visual beans in the work area. In FIG. 1, there are three visible beans: a conventional data matrix bean (with no data showing) 16, and the two check boxes 12 and 14. In addition there are two invisible beans represented by their icons. They are a DbQuery bean 18 and a DbCellRangeSelector bean 20.

2. Customize the properties of the beans. The two check boxes simply have their text labels changed to reflect the function that they are to perform, that is, "Invert data" and "Include column labels". The data matrix 16 needs no special customization. The DbQuery bean is customized by setting the query property to "select firstnme, lastnme, salary from employee", and the maximumRows property set to 5 to limit the size of the extracted query result. Other DbQuery properties are set to define the server and database of interest as explained above. The DbCellRangeSelector bean 20 is customized by setting the bindType property to String (indicating that when data has changed then the string property of the bean will be the subject of a property change event), the startColumnNumber and startRowNumber properties to 1, and the endColumnNumber and endRowNumber properties default to 0, indicating that all the columns and rows are to be retrieved from DbQuery. The invertData and includeColumnLabels properties will be controlled at run time by the two check boxes 12 and 14.

3. Make the bean connections. The first connection is based on a BeanMachine capability to trigger events when the applet being built is started. The execute method on DbQuery is to be triggered at this time, causing the DbQuery bean 18 to connect to the database, submit and execute the query, extract the results of the query into a new instance of the DbResultSet class, and close the database connection.

When the data is extracted, a property change event for the DbResultSet property of DbQuery is generated, and the occurrence of this event triggers the connection between the dbResultSet property of DbQuery, and the dbResultSet property of DbCellRangeSelector. The instance of DbResultSet created by DbQuery is thus passed to DbCellRangeSelector, and the arrival of the new DbResultSet at DbCellRangeSelector causes a property change event for the string property of DbCellRangeSelector to be generated. The occurrence of this event is to trigger a connection between the string property of DbCellRangeSelector 20 and the setValues method on the data matrix 16. Accessing the string property of DbCellRangeSelector coerces all the retrieved data values to Java Strings and returns them in a two dimensional array, which is exactly what is required by the data matrix setValues method. Note that the range of bound properties and type coercions offered by the selector beans is chosen to be sufficiently broad that whatever the data type required by the matrix bean, we would be likely to be able to configure a suitable selector bean to deliver the data in that type.

The check boxes 12, 14 generate a clicked event when a user selects or deselects them. The clicked event on the first check box 12 is to cause the InvertData property of DbCellRangeSelector to be set using the current state of the check box. The clicked event on the second check box 14 is to cause the IncludeColumnLabels property of DbCellRangeSelector to be set using the current state of the check box. Each of these property settings triggers a property change event for the string property of DbCellRangeSelector. The results of accessing the string property are tailored according to these property settings, hence modifying the data that is fed to the setValues method on the data matrix.

Figure 3:
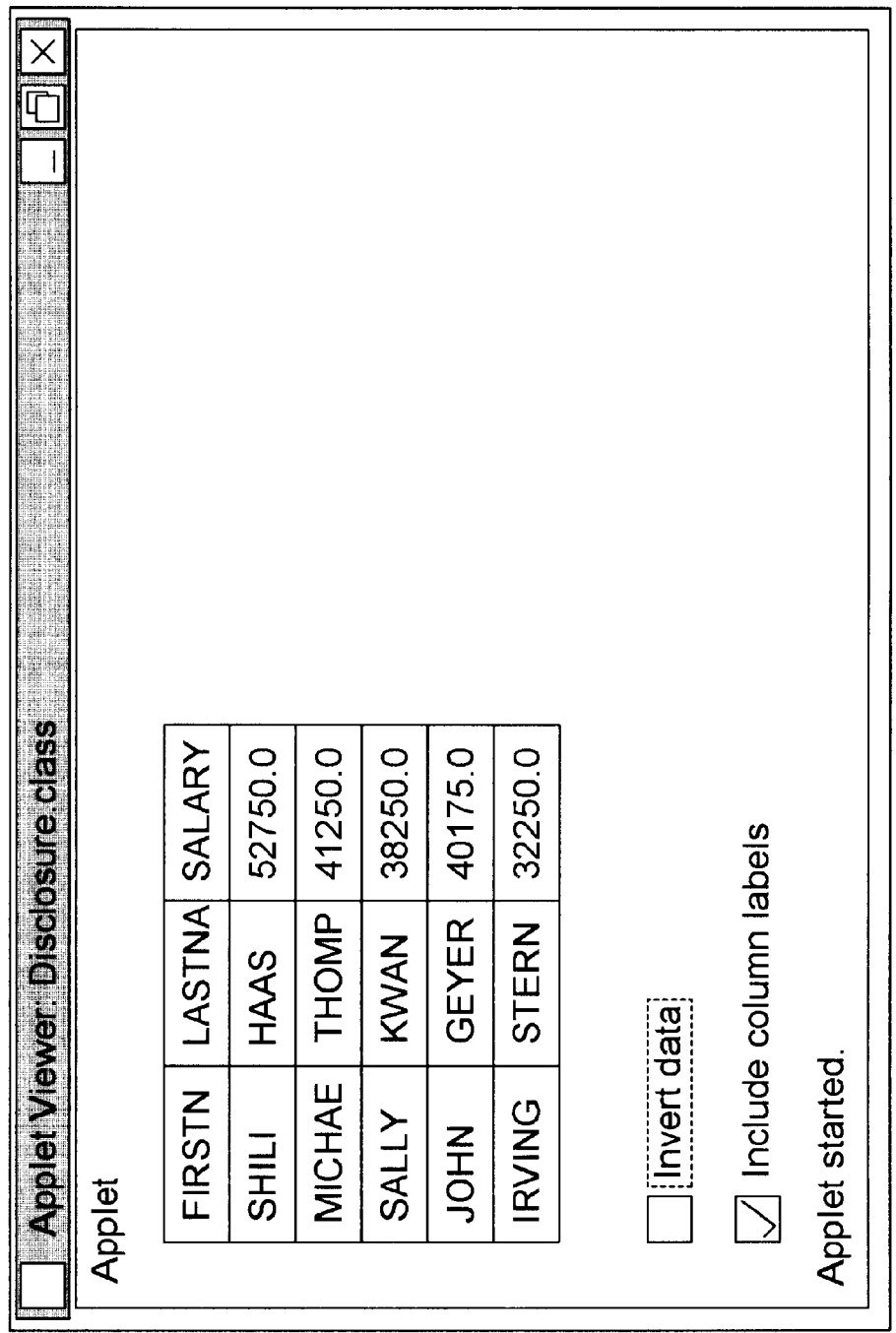
Figure 4:
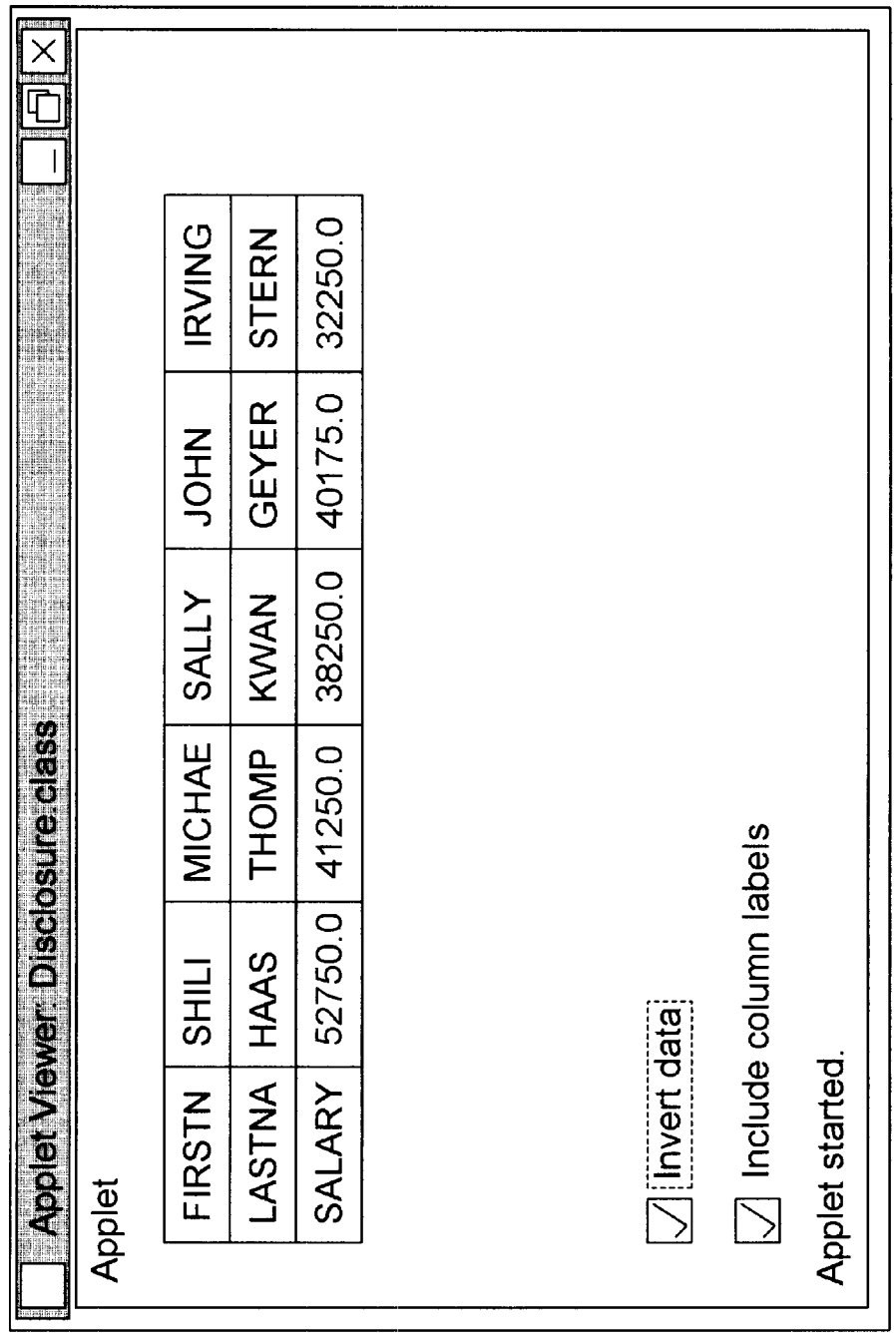
Figure 5:
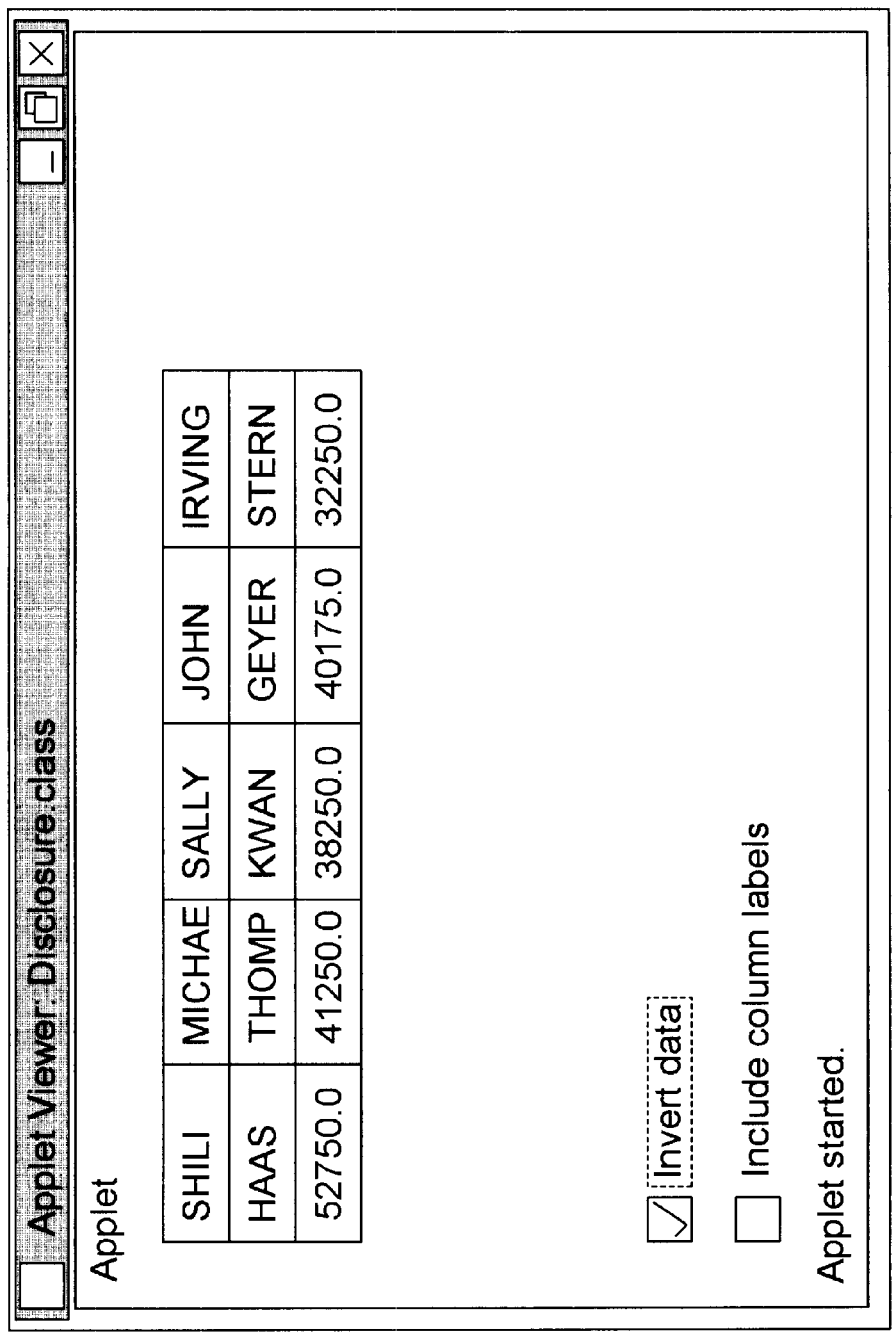

4. Build and run the applet. When first displayed, the data is not inverted, and column labels are not shown. When the include column labels check box 14 is selected, the clicked event is triggered, modifying the connected IncludeColumnLabels property on DbCellRangeSelector. This in turn triggers the setValues method on the data matrix, feeding in the data values extracted as strings including the database column labels for display as shown in FIG. 3. When the invert data check box 12 is selected, the clicked event is triggered, modifying the connected InvertData property on DbCellRangeSelector. This in turn triggers the setValues method on the data matrix, feeding in the data values, extracted as strings and inverting the values as they are put into the two dimensional array for display as shown in FIG. 4. When the include column labels check box 14 is deselected, it causes the data matrix to display the results as shown in FIG. 5.

As another example of usage, consider a simple table that includes employee name and number of sales. To display employee names in a list, all the employee names need to be extracted from a database to populate the list. To show a single bar chart for the currently selected employee, a single sales figure to be presented in the bar chart would need to be extracted each time an employee was selected in the list.

Using only a query bean, this would require multiple connections to be opened and closed for each query on the database. If the database is in a remote location, then this places a high communications overhead on the application and may possibly cause undue delays in response time.

Using the present invention, a instance of a DbQuery bean can be configured with a query such as "select name, sales from employee". A DbColumnSelector can be configured to return all the names as Java Strings. A DbCellSelector can be configured to return a single sales value as a "Java int" type, based on the value of its current RowNumber property, and can supply this value to the bar chart. The array of Strings from the DbColumnSelector can then be used to populate the list. In response to a list selection, the DbCellSelector's row number can be modified to reflect the selection index in the list. The modification of the row number on DbCellSelector will automatically feed a new sales number to the bar chart.

It will be seen that the capability to re-define the sub-set of the database query result identified by a selector bean at run time by the modification of properties on the selector bean proves to be extremely useful in developing this type of interactive application.

Thus, the present invention overcomes the need for multiple database accesses. The present embodiment allows a database including data of almost any type to be connected to a display component which accepts data in a specific format.

We claim:

1. A set of components for facilitating data extraction from a database in an application, comprising:
   a database driver manager that identifies a location of said database, defines a query on said database, connects to said database, executes said query, stores a result of said query, and sets a query result characteristic; and
   a number of selector components, wherein each selector component stores a result of a database query having a given data type and identifies a sub-set of said database query result, and wherein one of said selector components identifies a single cell from said database query result and presents that single cell as a single scalar value.

2. A set of components for facilitating data extraction from a database in an application, comprising:
   a database driver manager that identifies a location of said database, defines a query on said database, connects to said database, executes said query, stores a result of said query, and sets a query result characteristic; and
   a number of selector components, wherein each selector component stores a result of a database query having a given data type and identifies a sub-set of said database query result, and wherein one of said selector components identifies a single column from said database query result and presents said single column as a one-dimensional array of values.

3. A set of components for facilitating data extraction from a database in an application, comprising:
   a database driver manager that identifies a location of said database, defines a query on said database, connects to said database, executes said query, stores a result of said query, and sets a query result characteristic; and
   a number of selector components, wherein each selector component stores a result of a database query having a given data type and identifies a sub-set of said database query result, and wherein one of said selector components identifies a single row from said database query result and presents that single row as another one-dimensional array of values.

4. A set of components for facilitating data extraction from a database in an application, comprising:
   a database driver manager that identifies a location of said database, defines a query on said database, connects to said database, executes said query, stores a result of said query, and sets a query result characteristic; and
   a number of selector components, wherein each selector component stores a result of a database query having a given data type and identifies a sub-set of said database query result, and wherein one of said selector components identifies a range of columns and rows from said database query result and presents said range as a two-dimensional array of values.

5. A system using a set of components for facilitating data extraction from a database in an application, comprising:
   means for identifying a location of said database, defining a query on said database, connecting to said database, executing said query, storing a result of said query, and setting a query result characteristic, using a database driver manager; and
   means for storing a result of a database query having a given data type and identifying a sub-set of said database query result, using a number of selector components wherein one of said selector components identifies a single cell from said database query result and presents that single cell as a single scalar value.

6. A computer program product comprising a computer usable medium having computer readable program code means embodied in said medium for developing an object oriented application, said computer readable program code means comprising a database driver manager, a number of selector components, and a plurality of utility components, at least one of said utility components displaying the sub-set of a database query result identified by one of said selector components, wherein one of said selector components identifies a single cell from said database query result and presents that single cell as a single scalar value.

* * * * *